United States Patent [19]
Lindeborg et al.

[11] Patent Number: 6,032,232
[45] Date of Patent: Feb. 29, 2000

[54] MULTIPORTED MEMORY ACCESS SYSTEM WITH ARBITRATION AND A SOURCE BURST LIMITER FOR BLOCKING A MEMORY ACCESS REQUEST

[75] Inventors: Carl John Lindeborg, Shrewsbury; David Stoner, Sudbury, both of Mass.

[73] Assignee: 3Com Corporation, Santa Clara, Calif.

[21] Appl. No.: 08/865,243

[22] Filed: May 29, 1997

[51] Int. Cl.⁷ .............................. G06F 12/00; G06F 13/28
[52] U.S. Cl. ..................... 711/149; 711/151; 711/154; 711/158; 711/163; 710/36
[58] Field of Search ...................... 711/149, 150, 711/151, 152, 154, 158, 163, 167; 395/672, 673, 826; 365/189.03; 710/36

[56] References Cited

U.S. PATENT DOCUMENTS

| | | | |
|---|---|---|---|
| 4,449,183 | 5/1984 | Flahive et al. ......................... | 711/141 |
| 4,796,232 | 1/1989 | House ................................. | 365/189.03 |
| 5,293,491 | 3/1994 | Leung et al. .......................... | 395/848 |
| 5,421,011 | 5/1995 | Camillone et al. ..................... | 395/674 |
| 5,515,523 | 5/1996 | Kalkunte et al. ...................... | 711/149 |

OTHER PUBLICATIONS

Andrew S. Tanenbaum, "Modern Operating System", Prentice Hall, Inc. pp. 61–71, 1992.

*Primary Examiner*—Eddie P. Chan
*Assistant Examiner*—Hong Kim
*Attorney, Agent, or Firm*—McGlew and Tuttle, P.C.

[57] ABSTRACT

A multiport or multiported memory device is provided. A first user and at least a second user are provided. A multilevel memory arbitration system is implemented which establishes arbitration cycles wherein the high priority user is granted priority as to access either during each arbitration cycle or during a greater number of arbitration cycles. A source burst limiter is provided associated with the high priority user. The source burst limiter monitors access of the high priority user to the multiport memory and limits such access based on a comparison of access attributes to some access attribute threshold.

6 Claims, 6 Drawing Sheets

Arb State refers to the current state of the largest memory arbitor. Reference "A" indicates Arbitration State. Reference "D" indicates Data State. All signals are active high. Signals with a suffix of "1" are specific to User1. Signals with a suffix of "2" are specific to User2.

MULTIPORTED MEMORY ACCESS SYSTEM WITH ARBITRATION AND A SOURCE BURST LIMITER FOR BLOCKING A MEMORY ACCESS REQUEST

FIELD OF THE INVENTION

The present invention relates generally to implementations using high performance real time/imbedded processor designs utilizing multiported memories and more particularly multiported memories with access controlled through the use of a multilevel memory arbitration.

BACKGROUND OF THE INVENTION

Multiported memories provide an effective mechanism for access by a plurality of users to a memory. Such multiported memories avoid problems inherent with single bus access. These memories or multiported memory arrangements may be used in combination with high performance real time/imbedded processor designs. However with these designs, it is often very desirable or even necessary to guarantee low latency to one or more critical users of the multiported memory. Low latency guarantees may be achieved through the use of a multilevel memory arbitration.

Multilevel arbitration schemes, wherein different access priority levels are set, can result in periods when there is extremely high memory access latency for low priority users. Specifically, to provide the low latency guarantee for the critical users of the memory, the low priority users suffer.

Certain high performance processors and application specific devices have bus interface units that queue memory operations. In a multilevel arbitration scheme providing access to the critical users of the memory, the non-critical users can get shut out for long periods of time. Specifically, the critical memory users are able to assert the next memory request as soon as the present operation is completed. When the next request to the target memory occurs within the arbitration window of the target memory, the high priority user again has access to the memory. This can result in the high priority user being granted many contiguous accesses or back-to-back accesses.

With the scheme as described above, multiple contiguous accesses can result which impose a very high latency for low priority users. Ultimately, the high latency for the low priority users results in a negative impact on system performance.

Instead of providing a multilevel memory arbitration, a more complex arbitration scheme can be implemented. This can be effective in reducing the latency problem. However, these solutions may be to gate intensive to implement without semi-custom or custom ASICs (application specific integrated circuits). Such complex arbitration schemes may be difficult to tune for optimal performance. This is bparticularly true if the memory control/arbitration device is used in varying applications.

SUMMARY AND OBJECTS OF THE INVENTION

It is an object of the invention to provide a system with a memory means having more than one access port with the memory means connected to at least a high priority user and another user wherein access to the multiport memory is determined using a multilevel arbitration scheme establishing the priority of the high priority user and the at least one other user and wherein a source burst limiter is provided for limiting access of the high priority user to the multiport memory based on some access threshold.

It is another object of the invention to provide a multiported memory system involving multiple users wherein a simple multilevel arbitration system is used for memory access wherein successive memory uses by a high priority user are limited so as to guarantee low priority users a worst case latency to a target memory.

According to the invention, a multiport or multiported memory device is provided. A first user and at least a second user are provided. A multilevel memory arbitration system is implemented which establishes arbitration cycles wherein the high priority user is granted priority as to access either during each arbitration cycle or during a greater number of arbitration cycles. A source burst limiter is provided associated with the high priority user. The source burst limiter monitors access of the high priority user to the multiport memory and limits such access based on a comparison of access attributes to some access attribute threshold.

The invention provides an effective use of a multiport memory wherein complicated arbitration schemes are avoided but wherein all users are guaranteed a worst case latency to the target memory (the multiported memory).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
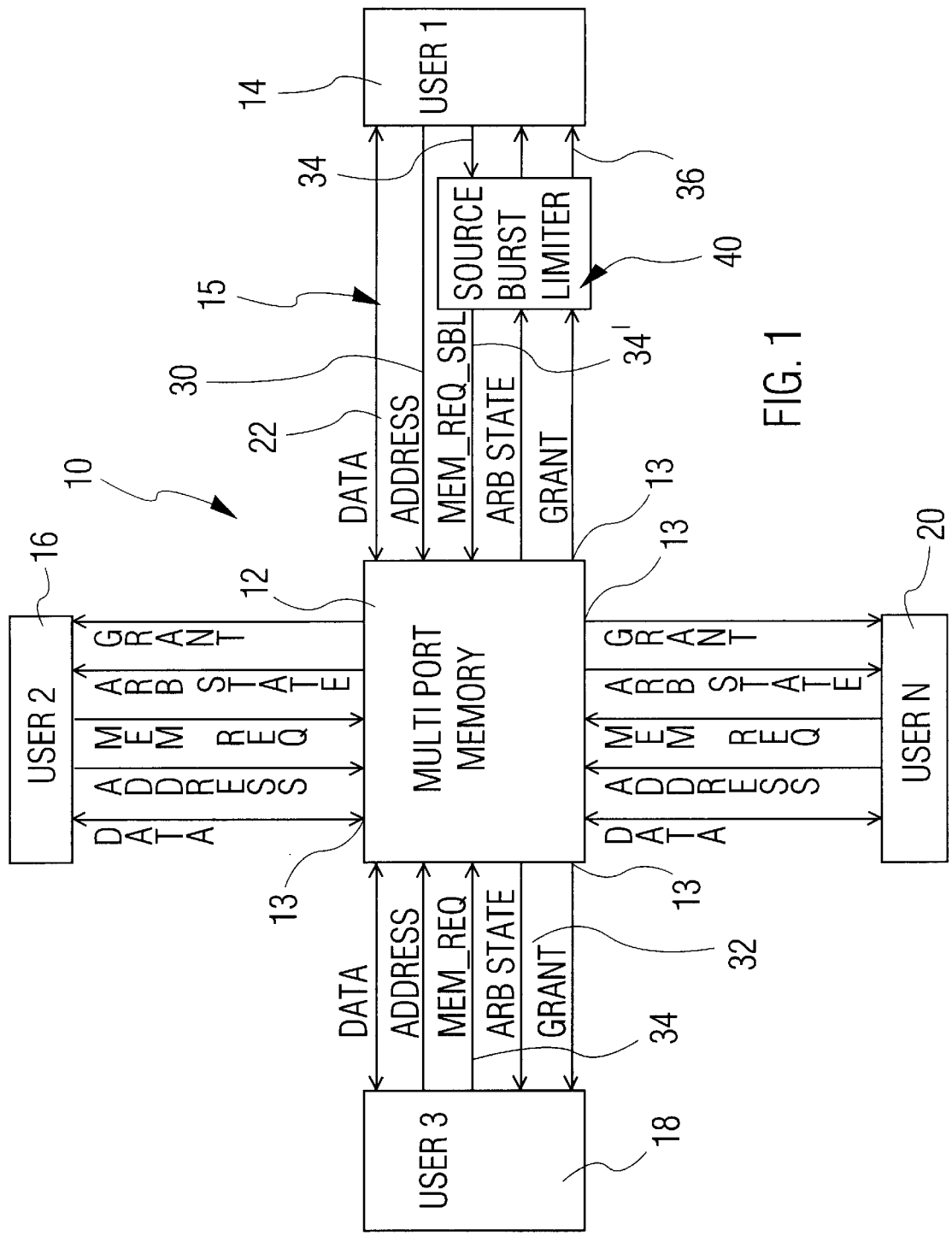
FIG. 1 is a schematic circuit diagram view showing a multiported memory connected to users according to one embodiment of the invention.

Referring to the drawings in particular, the invention comprises a multiport memory system generally designated 10, including a multiport memory 12. The multiport memory 12 has a plurality of ports (at least two ports) wherein a plurality of users are each connected via a port. FIG. 1 shows an example of a random access multiport memory 12 with four ports, however, as few as two ports or many ports may be provided. The multiport memory is connected to users such as user 1 designated 14, user 2 designated 16, user 3 designated 18 and user N designated 20. Each of the users can separately read and write information from and to the memory 12. According to a preferred embodiment, access to the memory is controlled by a multilevel arbitration system wherein user 1 is given highest priority as to access to the memory 12. A source burst limiter (SBL) 40 is connected to the bus 15 of the user 1 to limit the access of this user 1 to the memory 12.

Figure 2:
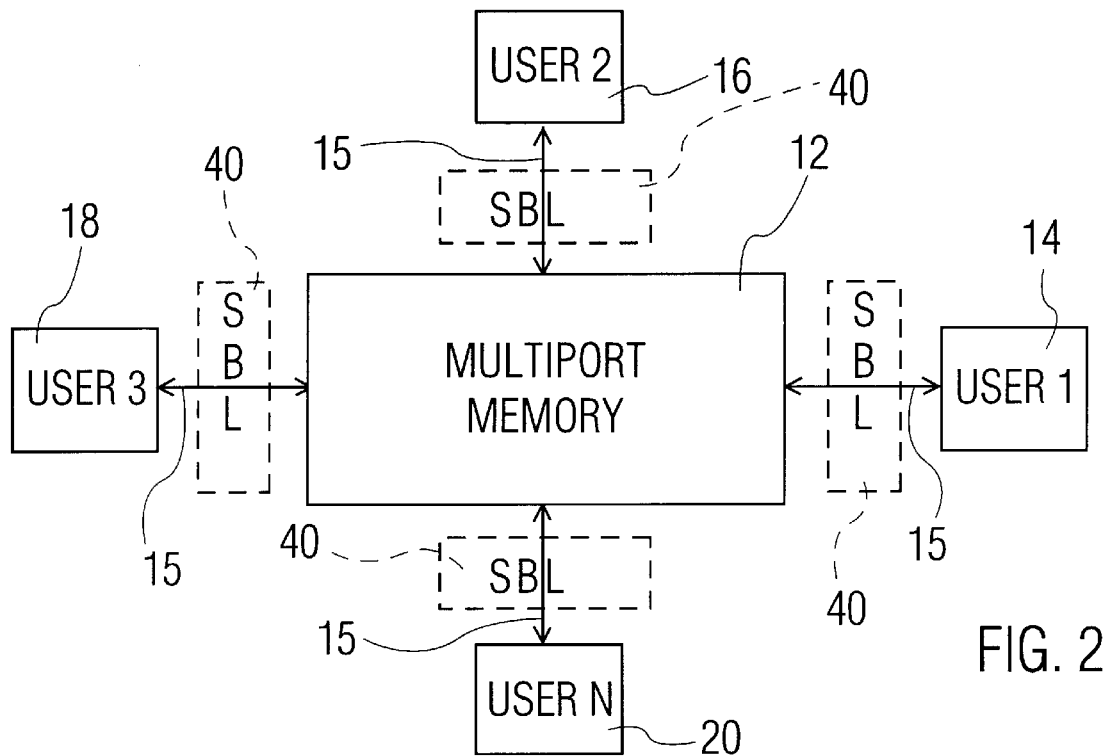
FIG. 2 is a schematic view showing alternative embodiments according to the invention.

A shown in FIG. 2, any of the users 14, 16, 18 and 20 may be the high priority user and may have a bus 15 connected to a SBL 40. At least one of the users, 14, 16, 18 and 20 could be a low priority user. Further, a different multilevel arbitration scheme or another arbitration scheme (other than that described below) could be implemented wherein source burst limiters 40 could be used at one or many of the connections between the users and the multiport memory 12.

The memory 12 can include a plurality of memory units so that many individual sets of information can be stored. Each set of information can be analyzed and processed individually. Each of the plurality of ports or port means 13 of the memory 12 is preferably substantially equal in operational speed. The word length of each of the ports 13 can vary depending on the entity which the port serves.

Figure 3:
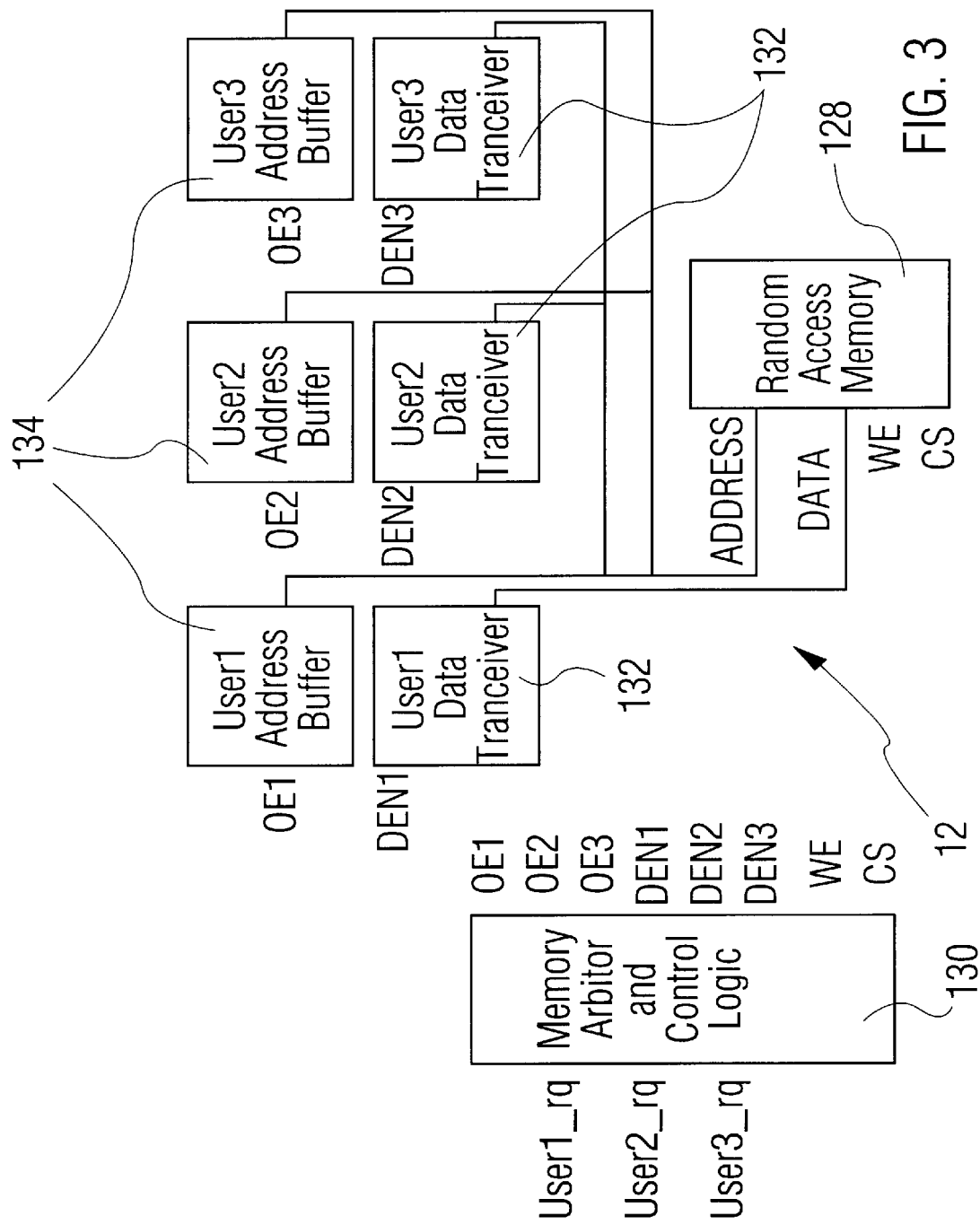
FIG. 3 is a schematic circuit diagram view showing a memory means forming a multiported memory of the invention.

FIG. 3 provides a detailed schematic view of memory 12. Memory 12 may be of any technology type or access method (random or fixed access). A random access memory element 128 is shown in FIG. 3, A memory arbitration and control logic device 130 is preferably implemented in programmable logic or semi-custom logic. In addition to providing arbitration for the users of the memory, this logic 130 will normally provide control signals for data transceivers 132, address buffers 134, and strobes to the memory devices. Control signals will vary depending on the type of memory, addressing scheme, and timing requirements. FIG. 3 shows a typical arrangement for a three-ported random access memory.

Figure 4:
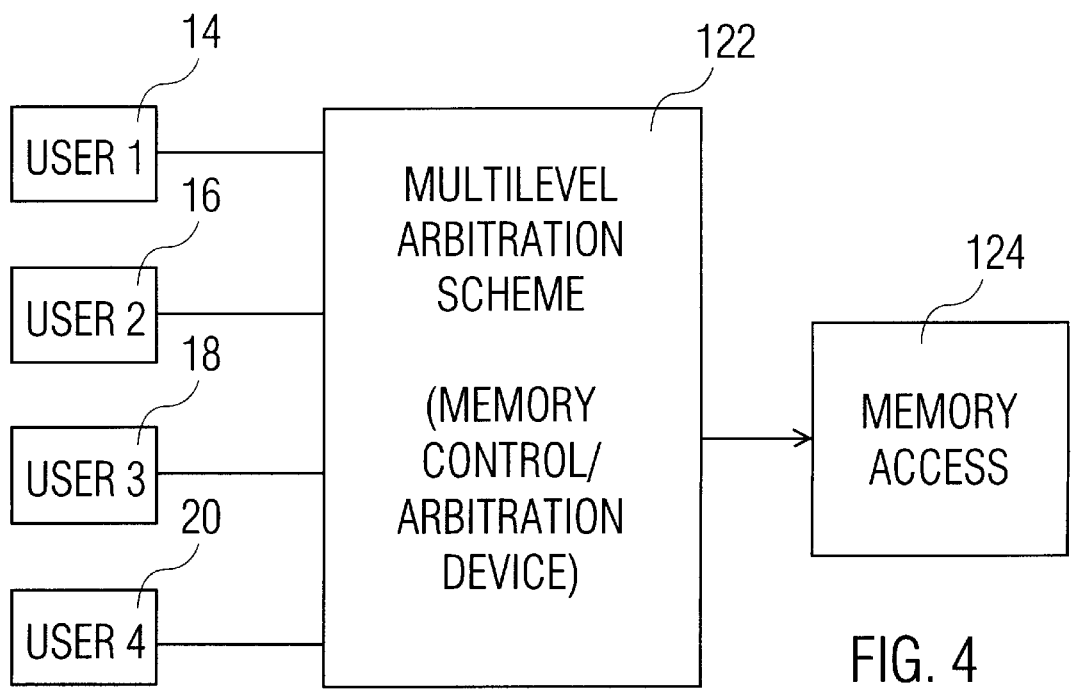
FIG. 4 is a diagram showing the control of memory access with a memory control arbitration device according to the invention.

As shown in FIG. 4, the memory 12 includes an arbitration means or memory control/arbitration device 122 as shown in the schematic diagram of FIG. 3 as control logic device 130. This memory control/arbitration device 122 determines which port 14, 16, 18 and 20 has first priority to information or packets contained in the memory or access to the memory, should there be a simultaneous read/write request.

The multilevel arbitration scheme may be quite simple, namely providing two different priority levels, namely a high priority and a low priority. The ports 13 connected to devices 14, 16, 18 and 20 are assigned these priority levels. The arbitration procedure starts wherein the simultaneous request for the memory are received (simultaneous MEM_REQ). It is considered whether the MEM_REQ signal is from the user 1 (the user at the high priority port). Under the simple multilevel priority scheme, with one of the simultaneous requesters being user 1, the device 14 having a high priority, memory access is provided (this high priority port or high priority user number 1 is given access). If the high priority device 14 is not requesting access simultaneously with other ports, an arbitration procedure is followed. This may be advantageously a simple round robin procedure wherein access is allocated in each arbitration window to one of the low priority devices 16, 18 and 20.

The following shows a VHDL (VLSI Hardware Description Language—IEEE 1164) model of a typical two level arbitration scheme where one user is at a fixed high priority, and two others users arbitrate at low priority. The high priority user will always win an arbitration regardless of low priority user requests. The low priority user arbitration is a "Last Used, Lowest Priority" scheme. Simply put, the last low priority user to win arbitration, will have the lowest priority until another low priority user wins an arbitration.

```
Entity arb IS
  PORT ( rst : IN std_logic;              -- system reset
         clk : IN std_logic;              -- system clock
         user1_rq, user2_rq,              -- user requests
         user3_rq: IN std_logic;
         user1_end, user2_end,            -- memory end of access
         user3_end: std_logic);
END arbitor;
ARCHITECTURE arbitor OF arbitor IS
  TYPE states IS (idle, gnt1,             -- Statemachine states
  gnt2, gnt3);
  SIGNAL state : states := idle;
  SIGNAL user2_last :                     -- USER2 last low priority user granted
  std_logic;
  SIGNAL user1_gnt, user2_gnt,            -- memory grants
  user3_gnt : std_logic;
BEGIN
statemachine : PROCESS (clk, rst)
  BEGIN
  IF rst = '0' THEN
      state <= idle;
      user2_last <= '1';
  ELSIF ((clk = '1') AND (clk'EVENT)
  AND (clk'LAST_VALUE = '0')) THEN
    CASE state IS
      WHEN idle => IF (user1_rq = '1') THEN
          state <= gnt1;
        ELSIF ((user2_rq = '1') AND ((user2_last = '0')
        OR (user2_rq = '0'))) THEN
            state <= gnt2;
            user2_last <= '1';
        ELSIF (user3_rq = '1') THEN
            state <= gnt3;
            user2_last <= '0';
        END IF;
      WHEN gnt1 => IF (user1_end = '1') THEN
        IF (user1_rq = '1') THEN
            state <= gnt1;
        ELSIF ((user2_rq = '1') AND ((user2_last = '0')
        OR (user2_rq = '0'))) THEN
            state <= gnt2;
            user2_last <= '1';
        ELSIF (user3_rq = '1') THEN
            state <= gnt3;
            user2_last <= '0';
        ELSE
            state <= idle;
        END IF;
      END IF;
      WHEN gnt2 => IF (user2_end = '1') THEN
        IF (user1_rq = '1') THEN
            state <= gnt1;
        ELSIF ((user2_rq = '1') AND ((user2_last = '0')
        OR (user2_rq = '0'))) THEN
            state <= gnt2;
            user2_last <= '1';
        ELSIF (user3_rq = '1') THEN
            state <= gnt3;
            user2_last <= '0';
        ELSE
            state <= idle;
        END IF;
      END IF;
      WHEN gnt3 => IF (user3_end = '1') THEN
        IF (user1_rq = '1') THEN
            state <= gnt1;
        ELSIF ((user2_rq = '1') AND ((user2_last = '0')
        OR (user2_rq = '0'))) THEN
            state <= gnt2;
            user2_last <= '1';
```

```
        ELSIF (user3_rq = '1') THEN
            state <= gnt3;
            user2_last <= '0';
        ELSE
            state <= idle;
        END IF;
    END IF;
    WHEN others => null;
END CASE;
END IF;
END PROCESS;
```

The memory means 12 includes an arbitration means to determine which user 14, 16, 18 or 20 has first priority to the information or packets contained in the memory, should there be a simultaneous read/write request. User 1 is the high priority user, if it has a request, it is always given priority.

FIG. 1 shows the multiport memory 12, connected to a plurality of devices 14, 16, 18, 20 at the corresponding ports 13. The data bus or bus 15 of each device is connected to one of the ports 13 directly or there is a direct connection between the multiport memory 12, at a port 13 to a bus 15 of a user. The bus 15 may include for example a clock line, a plurality of data lines such as data lines 22 (the data lines may be for example 8 data lines), address lines 30, an arb state line 32 (indicating the arbitration means state), a memory request line or MEM_REQ line 34 and a memory grant line 36. Connected to at least one high priority user such as user 1—device 14, and the port 13 of the multiport memory 12 there is provided the SBL generally designated 40. The SBL 40 has an input connected to at least the Mem_Req line 34 and the drawings also show a connection to the arb state line 32 and the memory grant line 36 of the data bus 15 of user number 1. In FIG. 1, the SBL 40 is shown schematically as interposed between the user 1 and the port 13. However, the SBL 40 receives as an input only selected lines from the bus 15 of user 1 and may be used to effect only one line of the input into port 13, namely the MEM REQ line 34.

Figure 5:
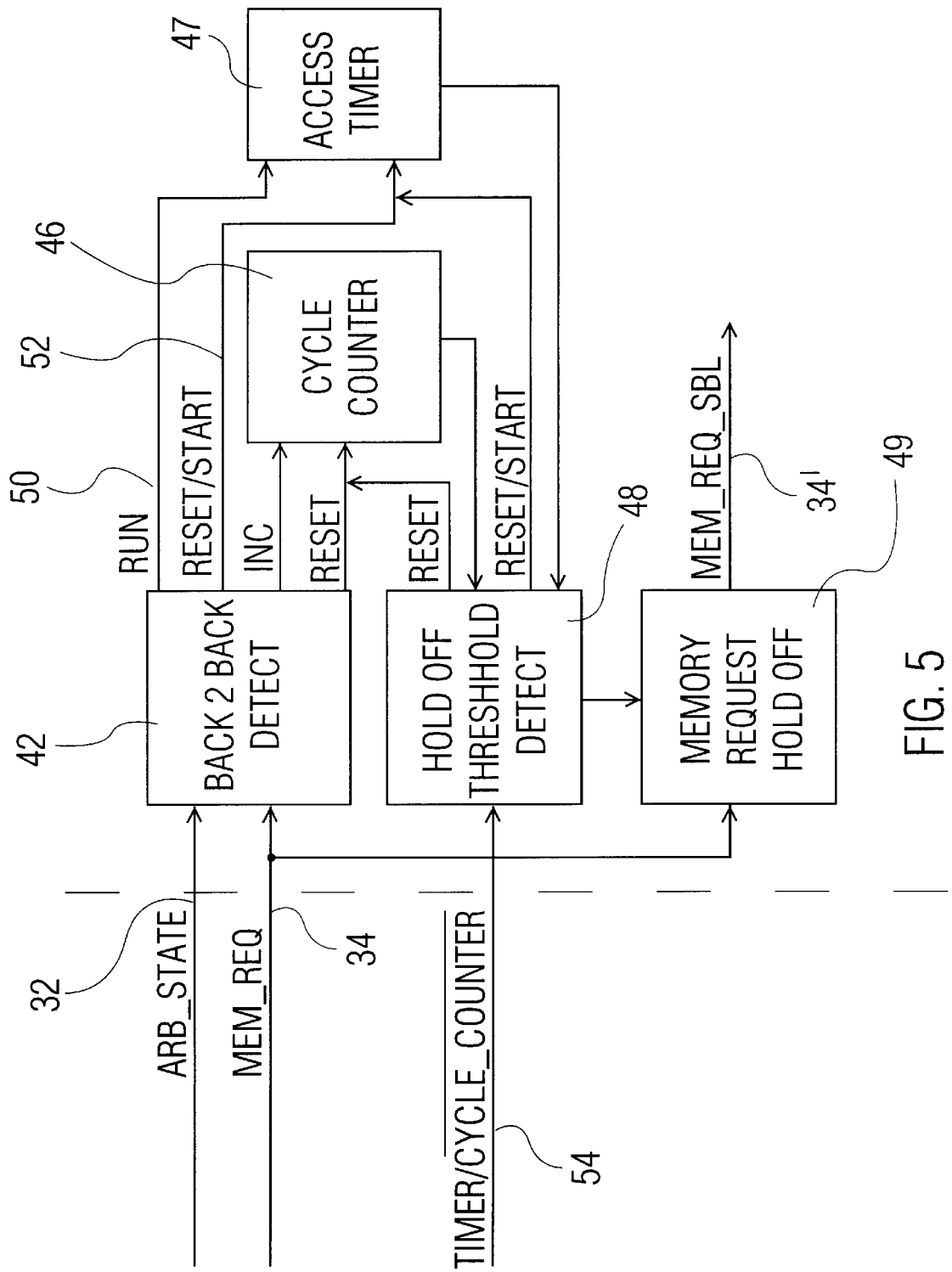
FIG. 5, is a circuit diagram view showing functional components of the source burst limiter according to the invention.

FIG. 5 provides a schematic showing of the SBL 40. The SBL 40 is connected preferably to the arb state line 32 and the MEM REQ line 34 of the bus 15 connected to user number 1. The SBL 40 may be able to predict the arbitration window. For those cases, a direct connection to an arbitration indication is not required. Certain memory implementations requiring non user cycles such as DRAM refresh, will require direct observation. A back-to-back access detect element 42 detects the arbitration state from line 32 and the memory request state at line 34. As the SBL 40 is connected to a priority device 14, namely user 1, a request to the target memory 12 by the priority user 14 within an arbitration window of the memory 12 results in access to the memory. Accordingly, when there is a memory request within the next subsequent arbitration window, the back-to-back access detect element 42 increments a cycle counter 46. The SBL 40 then detects when the counter 46 has reached a predefined hold off threshold. This occurs when a preset number of back-to-back accesses has occurred by the priority user 1 (device 14) such that a preset back-to-back access threshold has been reached as detected by hold off threshold at detect 48.

The hold off threshold detect 48 also activates memory access request hold off element 49 which holds off a request to the target memory 12 until the memory arbiter 122 can complete at least one arbitration cycle. When this threshold has been reached, the hold off threshold detect 48 signals to reset counter 46. Considering FIG. 4, this allows other users to gain access. However, when a memory request is not asserted by the priority user 14 during the next arbitration window, the back-to-back access to detect 42 signals to reset counter 46.

Burst limitation thresholds can be set either by a number of consecutive memory accesses or on a pure time limit basis. A typical SBL such as SBL 40 uses one method. FIG. 5 also shows a time limit basis scheme wherein the timer 47 is connected to the hold off threshold detect 48 and timer/cycle counter line 54 as well as to the Run line 50 and the Reset/start line 52 from the back to back detect 42. When an arbitration request is initially made, where the present user access was another user location, hold off cycle, or bus idle, the timer 47 is started. If subsequent access requests are to the target memory, and if they fall within the arb window, the timer is allowed to run. If the timer 47 expires a subsequent request is held off one arbitration cycle. When a request for target memory occurs within the arbitration window by the priority user 14 driving the MEM_REQ line 34 high, the timer 47 is allowed to run until a subsequent arbitration window. If no memory request on line 34 by the priority user 14 occurs in the arbitration window, the timer is reset. If the priority user 14 continues to make further requests during subsequent arbitration windows, many contiguous accesses may be granted. However, when the timer 47 reaches a predetermined threshold, without an arbitration window opening with no memory request by the priority user 14, a hold off threshold detect 48 will determine that the time limit has been reached and activate memory access request hold off means 49. Hold off means 49 blocks the Mem_Req signal 34 via Mem_Req_SBL line 34'

As can be appreciated from FIG. 5, the threshold counter 46 is reset by one of two events. The counter and/or timer are reset each time the memory user stops using the particular target memory for at least one memory arbitration window. Non-use may take the form of the user accessing another memory region, I/O region, or no external access (bus idle—priority user 14 bus 15 having no memory request). Cycle counter 46 is also reset if the SBL 40 enforces a hold off event. Upon detection of a hold off event, device 48 will reset cycle counter 46.

Figure 6:
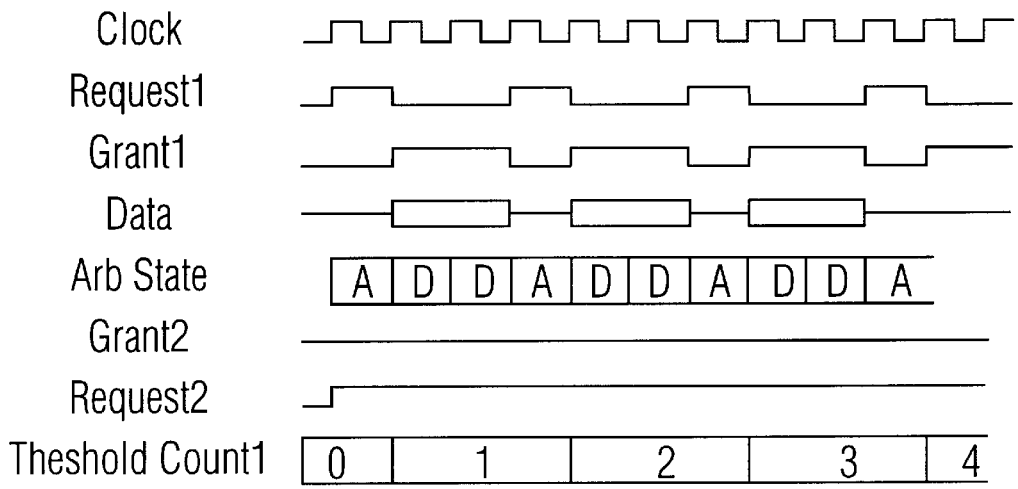
FIG. 6, is a timing diagram of two users of the memory attempting to access a multiported memory.

FIG. 6 shows a timing diagram of two users of a memory attempting to access a multiported memory. User 1 specific signal names include the signal "request 1" "grant 1" whereas user 2 signal names include "grant 2" and "request 2". The arbitration state (state of arb state line 34) is indicated "arb state". The other signals shown are the clock signal and data signals as well as a "threshold count 1". The signals "request 1" and "request 2" relate to the signals on the MEM REQ lines 34 for "user 1"—device 14—as well as "user 2"—device 16—. As can be seen in FIG. 6, user 1 and user 2 assert there respective memory request lines simultaneously in the first arbitration window. The memory control/arbitration logic 122 enforces the fixed priority scheme where user 1 has higher priority as compared to user 2. User 1 is capable of asserting a new memory request within the next arbitration window. Therefore, user 1 is capable of preventing user 2 from gaining access to memory 12. As stated earlier, the situation may continue for undesireably long periods of time.

Figure 7:
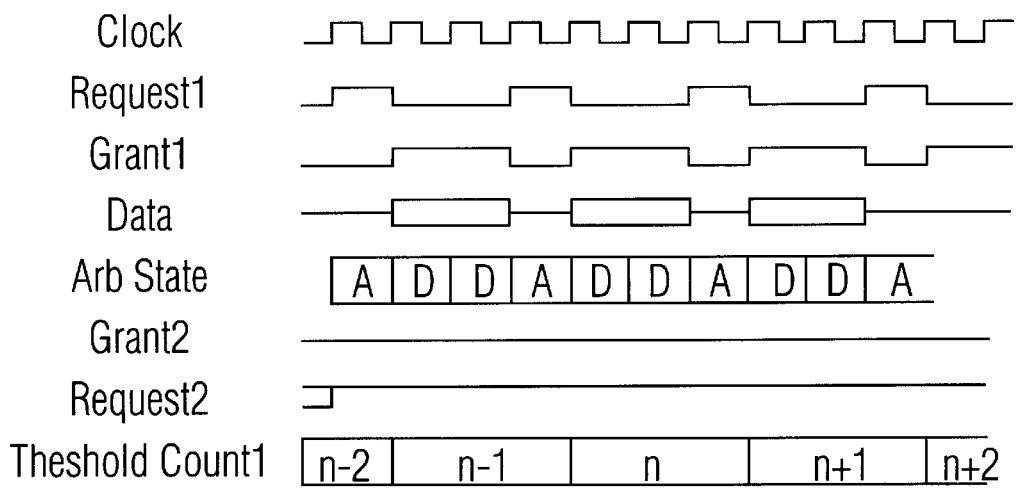
FIG. 7, is a timing diagram similar to FIG. 6 wherein the high priority user effectively prevents another or other users from gaining access to the memory.
Figure 8:
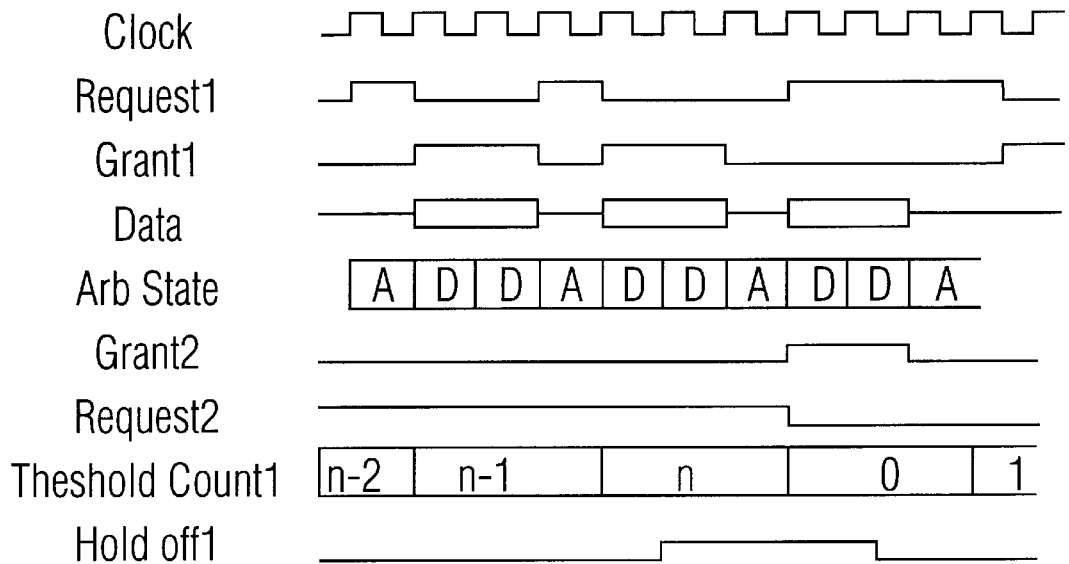
FIG. 8, is a timing diagram similar to FIG. 6, showing an implementation of an access counting by a source burst limiter.

FIG. 7 shows the hold off of user 2 continuing for "N+" accesses to target memory by user 1. FIG. 8 shows the implementation of an access counting SBL such a SBL 40 described above. With this type of threshold detection, the SBL 40 cycle counter 46 increments each time the user performs back-to-back accesses to the target memory. Such a back-to-back access is defined as accesses where a user requests target memory within the arbitration window for the next access to the target memory, after having just completed an access to the target memory. In FIG. 8, user 1 hits the threshold count of "N" and the next request to the target memory is delayed by the hold off signal from memory access request hold off element 49 such that user 2 is granted access. When the threshold count is hit, the hold off is enforced on accesses to the target memory and the cycle counter 46 is reset (such as reset to 0).

Figure 9:
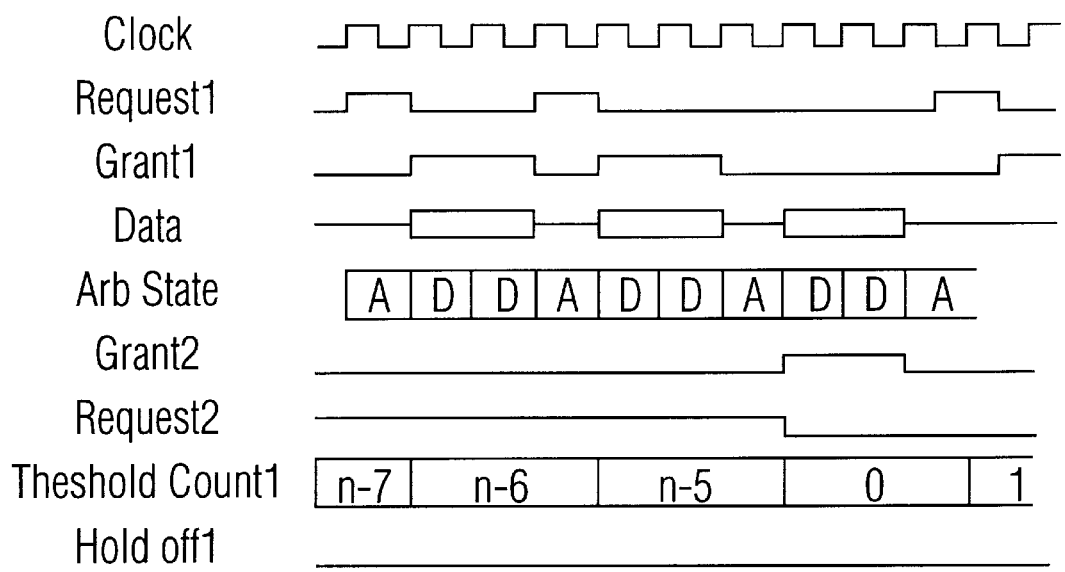
FIG. 9, is a timing diagram similar to FIG. 6 showing a resetting of a threshold counter when a high priority user does not request the target memory.

FIG. 9 shows a user 1 performing several memory access procedures to the target memory 12. After having completed a number of cycles, user 1 does not request the target memory within the next target memory arbitration window. The cycle counter 46 is then reset based on back-to-back access detect element 42. The target memory arbitration/control logic 122 then grants access to user 2 following the arb procedure described above.

While specific embodiments of the invention have been shown and described in detail to illustrate the application of the principles of the invention, it will be understood that the invention may be embodied otherwise without departing from such principles.

What is claimed is:

1. A memory access system, comprising:
   a multiported memory device including a plurality of ports;
   a first user connected by a first user bus to one of said plurality of ports;
   a second user connected by a second user bus to another of said plurality of ports;
   memory control/arbitration device associated with said multiported memory for controlling access to said multiport memory, said memory control/arbitration device providing a plurality of successive arbitration windows for determining access to said multiported memory, said memory control/arbitration device giving first priority to said first user, upon receiving simultaneous memory read and/or write requests;
   a source burst limiter connected to said first user bus and connected to said multiport memory, said source burst limiter observing or predicting an arbitration state for said arbitration windows and including a back to back detect means for monitoring a memory request by said first user to detect back-to-back memory access requests by said first user and said source burst limiter further including hold off threshold detection means for detecting when said first user has exceeded a predetermined threshold for back-to-back memory access, said source burst limiter blocking a memory access request from said first user to said multiport memory upon said first user exceeding said predetermined threshold for back-to-back memory access;
   counter means for counting the occurrence of each said back-to-back access; and
   reset means for resetting said counter means when there is either no said back-to-back memory access or said counter means has reached said predetermined threshold.

2. A memory access system, comprising:
   a multiported memory device including a plurality of ports;
   a first user connected by a first user bus to one of said plurality of ports;
   a second user connected by a second user bus to another of said plurality of ports;
   memory control/arbitration device associated with said multiported memory for controlling access to said multiport memory, said memory control/arbitration device providing a plurality of successive arbitration windows for determining access to said multiported memory, said memory control/arbitration device giving first priority to said first user, upon receiving simultaneous memory read and/or write requests;
   a source burst limiter connected to said first user bus and connected to said multiport memory, said source burst limiter monitoring or predicting an arbitration state for said arbitration windows and back to back detect means for observing a memory request by said first user to detect back-to-back memory access requests by said first user and said source burst limiter further including hold off threshold detection means for detecting when said first user has exceeded a predetermined threshold for back-to-back memory access, said source burst limiter blocking a memory access request from said first user to said multiport memory upon said first user exceeding a predetermined threshold for back-to-back memory access, wherein said memory control/arbitration device gives said first user priority of access to said multiported memory and said second user and subsequent users are granted memory access only when said first user has not requested access or when said predetermined threshold has been reached.

3. The system according to claim 2, wherein upon said second user and said subsequent users requesting access simultaneously and when said first user has not requested access or when said predetermined threshold has been reached, an arbitration procedure is implemented which includes a round robin procedure.

4. A memory access system, comprising:
   a multiported memory device including a plurality of ports;
   a first user connected by a first user bus to one of said plurality of ports;
   a second user connected by a second user bus to another of said plurality of ports;
   memory control/arbitration device associated with said multiported memory for controlling access to said multiport memory, said memory control/arbitration device providing a plurality of successive arbitration windows for determining access to said multiported memory, said memory control/arbitration device giving first priority to said first user, upon receiving simultaneous memory read and/or write access requests during;
   a source burst limiter connected to said first user bus and connected to said multiport memory, said source burst limiter including means for observing or predicting an arbitration state for said arbitration windows and means for monitoring a memory request by said first user to detect a time period of sequential memory access by said first user and said source burst limiter further including hold off threshold detection means for detecting when said first user has exceeded a predetermined time period threshold for sequential memory access, said source burst limiter blocking a memory access request from said first user to said multiport memory upon said first user exceeding said predetermined time period threshold for sequential memory access; and
   clock means for clocking a time period for sequential memory access by said first user;
   reset means for resetting said clock means when there is either no said sequential memory access or said clock means has reached said predetermined time period threshold.

5. A memory access system, comprising:

a multiported memory device including a plurality of ports;

a first user connected by a first user bus to one of said plurality of ports;

a second user connected by a second user bus to another of said plurality of ports;

memory control/arbitration device associated with said multiported memory for controlling access to said multiport memory, said memory control/arbitration device providing a plurality of successive arbitration windows for determining access to said multiported memory, said memory control/arbitration device giving first priority to said first user, upon receiving simultaneous memory read and/or write access requests during;

a source burst limiter connected to said first user bus and connected to said multiport memory, said source burst limiter including means for observing or predicting an arbitration state for said arbitration windows and means for monitoring a memory request by said first user to detect a time period of sequential memory access by said first user and said source burst limiter further including hold off threshold detection means to detect when said first user has exceeded a predetermined time period threshold for sequential memory access, said source burst limiter blocking a memory access request from said first user to said multiport memory upon said first user exceeding said predetermined time period threshold for sequential memory access, wherein said memory control/arbitration device gives said first user priority of access to said multiported memory and said second user and subsequent users are granted memory access only when said first user has not requested access or when said predetermined time period threshold has been reached.

6. The system according to claim 5, wherein upon said second user and said subsequent users requesting access simultaneously and when said first user has not requested access or when said time period threshold has been reached, an arbitration procedure is implemented which includes a round robin procedure.

* * * * *